(12) United States Patent
Takeuchi

(10) Patent No.: US 7,514,834 B2
(45) Date of Patent: Apr. 7, 2009

(54) PERMANENT MAGNET TYPE THREE-PHASE AC GENERATOR

(75) Inventor: Norikazu Takeuchi, Handa (JP)

(73) Assignees: Denso Corporation, Kariya (JP); Danso Trim Co. Ltd., Mie (JP)

( * ) Notice: Subject to any disclaimer, the term of this patent is extended or adjusted under 35 U.S.C. 154(b) by 252 days.

(21) Appl. No.: 10/983,028

(22) Filed: Nov. 8, 2004

(65) Prior Publication Data

US 2006/0097599 A1 May 11, 2006

(51) Int. Cl.
H02K 1/00 (2006.01)
(52) U.S. Cl. .................................. 310/184; 310/156.26
(58) Field of Classification Search ............ 310/156.01, 310/156.12, 153, 179, 180, 184
See application file for complete search history.

(56) References Cited

U.S. PATENT DOCUMENTS

| | | | | |
|---|---|---|---|---|
| 5,017,822 | A | * | 5/1991 | Shimizu et al. ............. 310/207 |
| 5,939,849 | A | * | 8/1999 | Ushikoshi .............. 318/400.13 |
| 6,573,629 | B1 | * | 6/2003 | Morimatsu .................. 310/166 |
| 6,700,276 | B2 | * | 3/2004 | Hakamata ................... 310/179 |
| 2004/0090136 | A1 | * | 5/2004 | Uemura et al. ......... 310/156.26 |

FOREIGN PATENT DOCUMENTS

| | | | |
|---|---|---|---|
| JP | 58-22870 | U | 2/1983 |
| JP | U 59-122781 | | 8/1984 |
| JP | 61-39842 | * | 2/1986 |
| JP | A 2-254950 | | 10/1990 |
| JP | A 4-200258 | | 7/1992 |
| JP | U 5-15674 | | 2/1993 |
| JP | A 08-336249 | | 12/1996 |
| JP | A 09-098557 | | 4/1997 |
| JP | A 2000-156958 | | 6/2000 |
| JP | A 2001-112226 | | 4/2001 |
| JP | A 2003-018774 | | 1/2003 |
| JP | A 2003-111314 | | 4/2003 |
| JP | A 2003-180042 | | 6/2003 |
| JP | A 2003-250254 | | 9/2003 |
| JP | A 2003-284306 | | 10/2003 |
| WO | WO 03/028192 A1 | | 4/2003 |

* cited by examiner

*Primary Examiner*—Nguyen N Hanh
(74) *Attorney, Agent, or Firm*—Oliff & Berridge, PLC

(57) ABSTRACT

A permanent magnet type three-phase ac generator includes a stator having 3n (n is an integer) teeth and a tree-phase armature winding and a rotor having 4n magnetic poles each of which has a permanent magnet. The three-phase winding includes 3n coils each of which is wound around one of the teeth and connected to form three phase windings, and each coil wound around a first tooth is connected to another coil wound around another tooth that is fourth from the one of the teeth so that vectors of voltage induced in the connected coils can direct in the same direction.

5 Claims, 5 Drawing Sheets

US 7,514,834 B2

PERMANENT MAGNET TYPE THREE-PHASE AC GENERATOR

CROSS REFERENCE TO RELATED APPLICATION

The present application is based on Japanese Patent Application 2002-156919, filed May 30, 2002, the contents of which are incorporated herein by reference.

BACKGROUND OF THE INVENTION

1. Field of the Invention

The present invention relates to a permanent magnet type three-phase ac generator that is mounted on a motor cycle to charge a battery and to supply electric power to a head lamp or an electric load.

2. Description of the Related Art

Recently, it has become necessary for a permanent magnet type three-phase ac generator to meet demands for size-reduction and power increase at a lower speed range.

In general, as the size of the generator is reduced, spaces for armature windings are also reduced. As a result, large-sized coils can not be mounted in a conventional permanent magnet type three-phase ac generator. Accordingly, the output current of at a higher speed range unnecessarily increases if the output current at a lower range is increased. This increased output power heats the coils up to an excessively high temperature.

JP-A 2001-112226 or its counterpart U.S. Pat. No. 6,573,629 discloses a permanent magnet type three-phase ac generator that has a rotor with 16 magnetic poles and a stator with 18 teeth, as shown in FIG. 10. The stator includes a three-phase armature winding having three phase-windings. Each phase-winding is composed of 6 coils connected as shown in FIG. 7. The rotor with 16 magnetic poles increases the frequency of alternating magnetic field, which increases the output voltage at a lower speed range and suppresses the output current at a higher speed range. Therefore, the size of the permanent magnet per pole can be reduced, and the temperature of the coils, which composes the armature winding, can be reduced. However, because there is a phase difference of 20 degrees in voltage induced in coils of the same phase-winding as shown in FIG. 8, the output voltage induced in the same phase-winding is suppressed. This is an obstacle of size reduction of the permanent magnets. The above structure also necessitates long wires to connect the coils in order to minimize differences in phase.

SUMMARY OF THE INVENTION

Therefore, an object of the present invention is to provide an improved permanent magnet type ac generator that is free from the above described problems.

Another object of the invention is to provide an inexpensive and powerful permanent magnet type ac generator that includes a common type stator and an improved rotor.

According to a feature of the invention, a permanent magnet type three-phase ac generator includes a stator having 3n (n is an integer) teeth and a three-phase armature winding, and a rotor having 4n magnetic poles each of which has a permanent magnet. In the above ac generator, the three-phase winding includes 3n coils each of which is wound around one of the teeth and connected to form three phase-windings.

In the above permanent magnet type three-phase ac generator, an additional feature is that each coil wound around a first tooth is connected to another coil that is wound around the tooth that is fourth from the first tooth so that vectors of voltage induced in the connected coils can direct in the same direction.

According to another feature of the invention, a permanent magnet type three-phase ac generator includes a stator having a stator core with 3n (n is an integer) teeth disposed in a circumferential direction at equal intervals and an armature winding having Δ-connected three phase windings and a rotor having 4n permanent magnet poles disposed to confront the teeth. In the above ac generator, the armature winding includes 3n coils each of which is wound around one of the teeth in the same winding direction and has a first and second ends, and the first end of each coil wound around one of the teeth is connected to the second end of another coil that is wound around a tooth disposed fourth from the one of the teeth to form one of the three phase-windings.

In the above permanent magnet type three-phase ac generator, an additional feature is that an electric angle between coils wound around adjoining teeth is 240°.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A permanent magnet type ac generator according to a preferred embodiment of the invention will be described with reference to the appended drawings.

Figure 1:
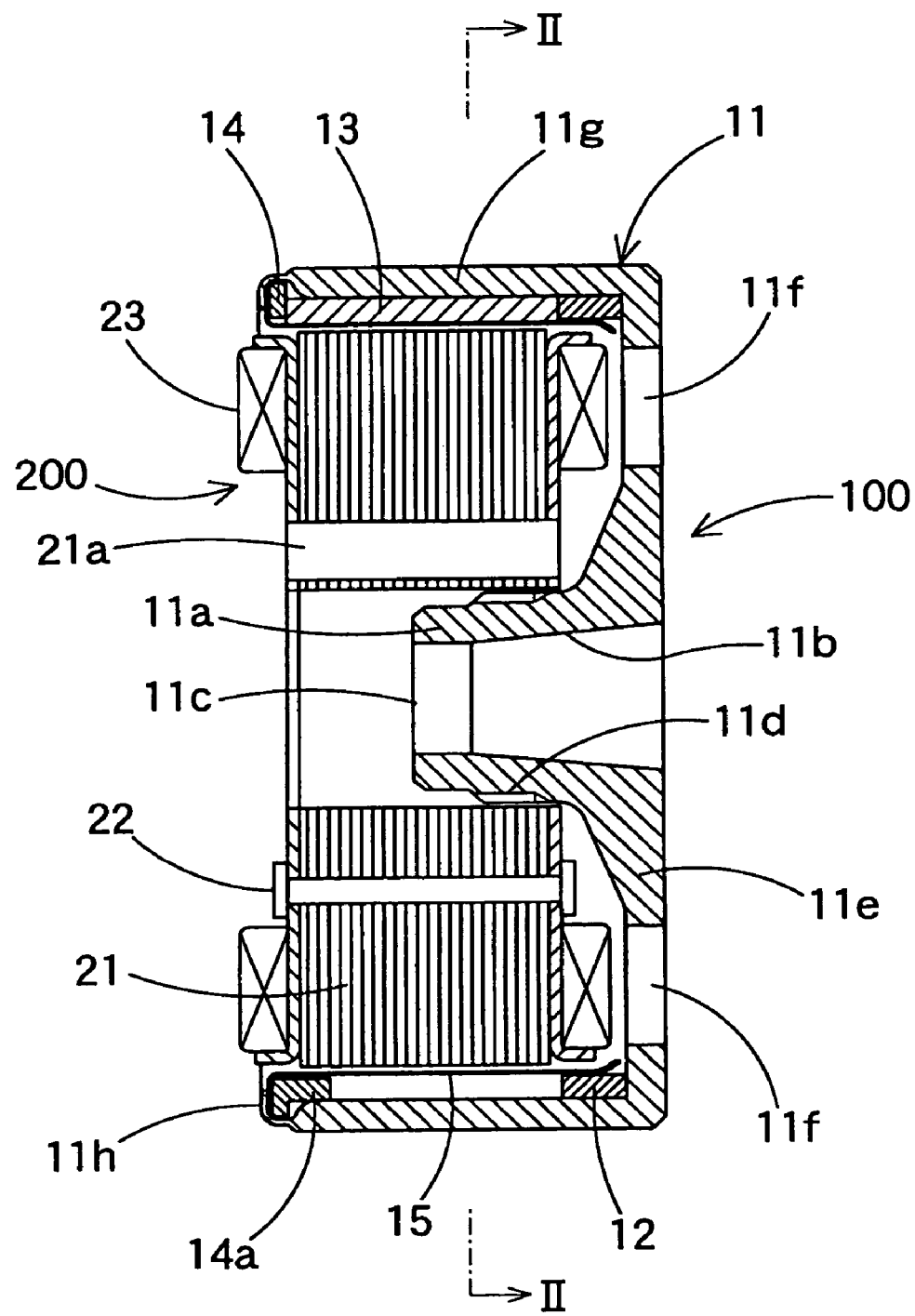
FIG. 1 is a cross-sectional side view of a permanent magnet type three-phase ac generator according to a preferred embodiment of the invention.
Figure 2:
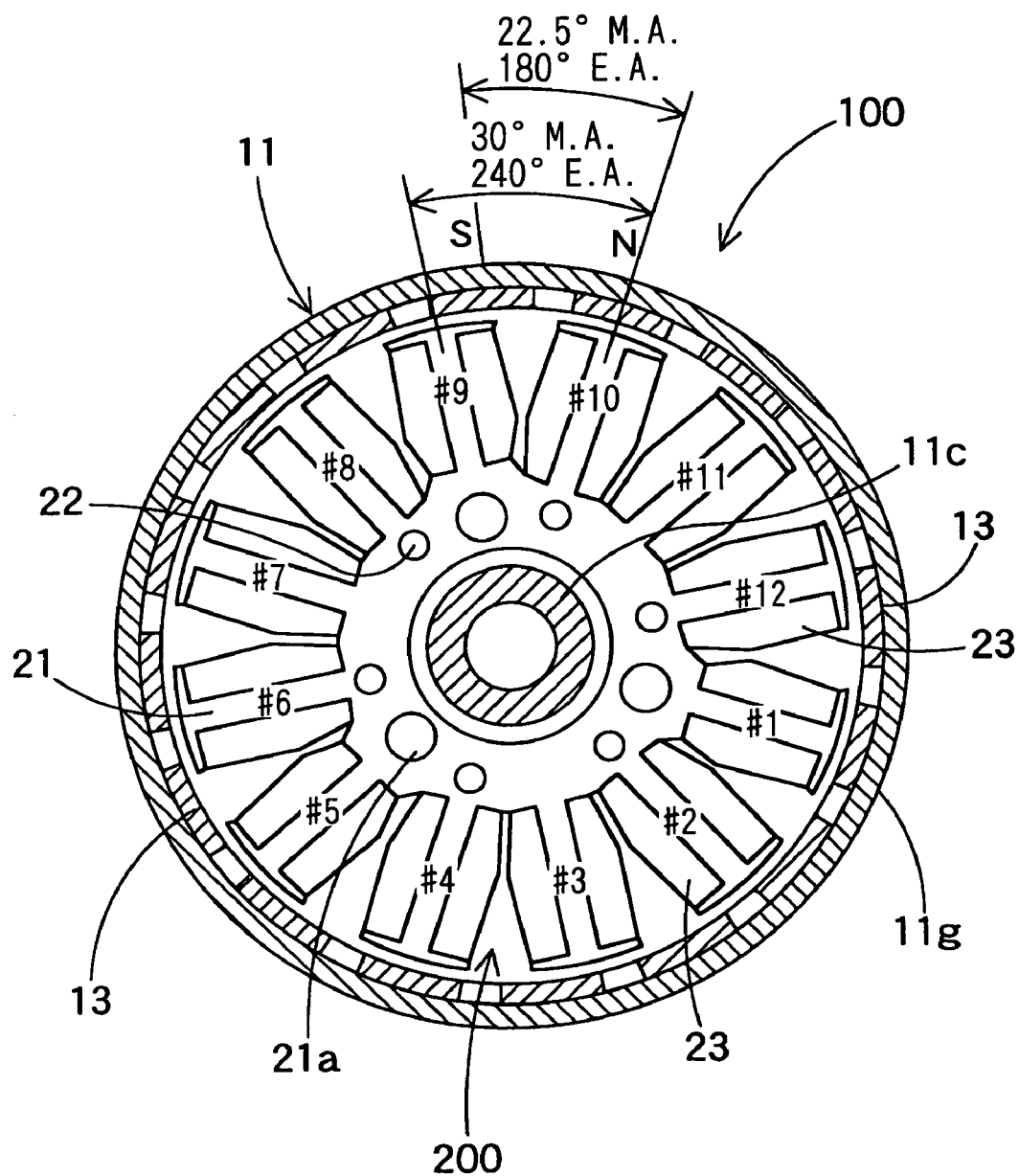
FIG. 2 is a cross-sectional plan view of the ac generator shown in FIG. 1 cut along line II-II.

As shown in FIGS. 1 and 2, the permanent magnet type ac generator according to a preferred embodiment is comprised of a rotor 100 and a stator 200.

The rotor 100 includes a cylindrical rotor member 11 made of a magnetic material, a non-magnetic annular spacer 12, a plurality of permanent magnets 13, a non-magnetic annular positioning case 14, and a protection ring 15. The rotor member 11 is formed through hot forging and shaped by a lathe. The rotor member 11 has a center boss 11a in which tapering portion 11b is formed to connect an engine crankshaft (not shown). The center boss 11a also has an end surface 11c on which a nut for fastening the rotor member 11 to the engine crankshaft is seated and a screw portion 11d by which the rotor 11 is taken off the crankshaft if necessary. The rotor member 11 has a disk portion 11e that has a plurality of cooling windows 11f, a cylindrical portion 11g that functions as a yoke. The permanent magnets 13 are disposed in a circumferential space of the positioning case 14 at equal intervals. For this purpose, the positioning case 14 has a plurality of projections 14a to position the permanent magnets in the circumferential direction.

The non-magnetic annular spacer 12, the permanent magnets 13 and the positioning case 14 are inserted into the inside of the cylindrical portion 11g so as to align in a direction parallel to the axis of the crankshaft. The protection ring 15 is made of a stainless steel and has a cylindrical portion that is press-fitted to the inner surfaces of the permanent magnets 13 and a hook portion formed at an end of the cylindrical portion to hold an end of the rotor-member's cylindrical portion 11h.

The stator 200 is disposed within the rotor 100. The stator 200 includes a laminated steel-plate core 21 and a plurality of coils 23 and is fixed to a prescribed portion of the engine by bolts through bores 21a formed in the magnetic core 21. The laminated magnetic core 21 is fixed by a plurality of rivets 22.

Figure 3:
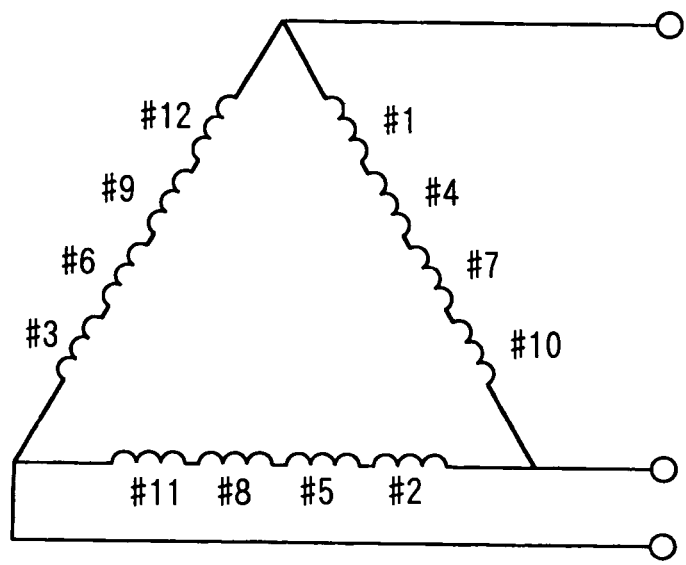
FIG. 3 illustrates connection of an armature winding having three phase-windings.

As shown in FIG. 2, the stator 200 has 12 teeth or 3n teeth in a circumferential direction at equal intervals. n is an integer. 12 coils are respectively wound around the teeth and connected as shown in FIG. 3. One of the coils (e.g. #1 in FIG. 3) on one of the teeth (e.g. #1 in FIG. 2) is connected to another coil (e.g. #4 in FIG. 3) on another tooth (e.g. #4 in FIG. 2), which is fourth from the tooth #1. This coil #4 on the tooth #4 is connected to coil #7 on the tooth #7 that is fourth from the tooth #4, which is connected to coil #10 on the tooth #10. In other words, every third coils 23 are connected by leads which cross two teeth. In the stator 200 that has 12 teeth, one magnetic pole angle is 30° in mechanical angle (M.A.) and 240° in electric angle (E.A.).

As shown in FIG. 2, the rotor 100 has 16 magnetic poles or 4n poles in which n is an integer. In the rotor 100 with 16 magnetic poles, one magnetic pole angle is 22.5° in mechanical angle and 180° in electric angle. Therefore, the phase difference between two of the first phase-winding that includes coils #1, #4, #7 and #10, the second phase-winding that includes coils #2, #5, #8 and #11 and the third phase-winding that includes coils #3, #6, #9 and #12 is 120° in electric angle, and no phase difference between two of the coils in the same phase-winding is generated.

Figure 7:
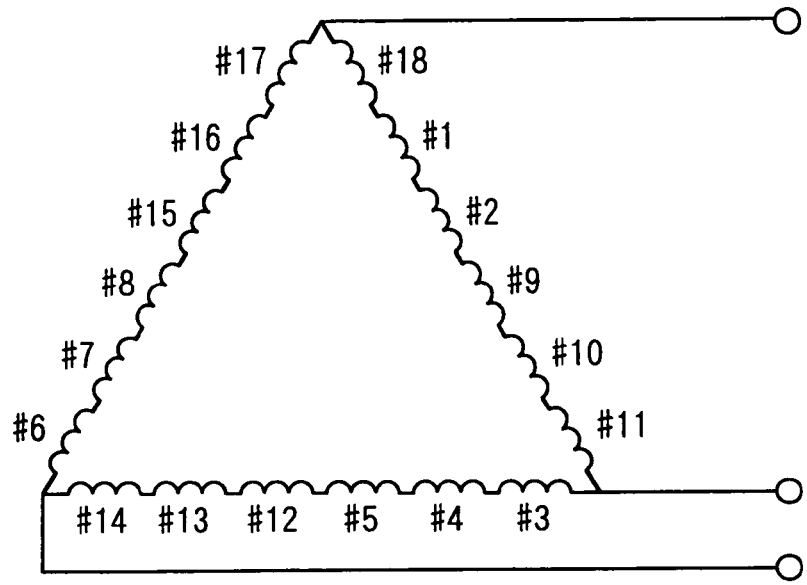
FIG. 7 illustrates a connection of the ac generator disclosed in JP-A 2001-112226.
Figure 8:
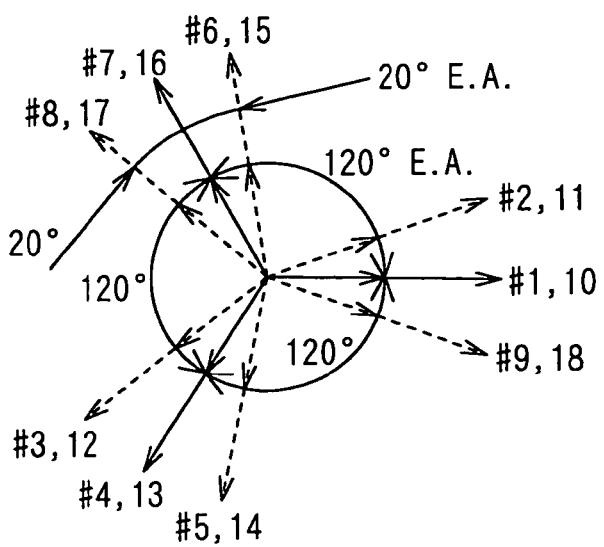
FIG. 8 is a vector diagram of output voltage of the ac generator disclosed in JP-A 2001-112226.

Therefore, if n=4, as shown in FIGS. 2 and 7, the conventional stator 200 has 30° in mechanical angle and 120° in electric angle, while the stator 200 according to the invention has 30° in mechanical angle and 240° in electric angle. Further, the conventional rotor 100 has 45° in mechanical angle and 180° in electric angle, while the rotor 100 according to the invention has 22.50° in mechanical angle and 180° in electric angle.

Figure 4:
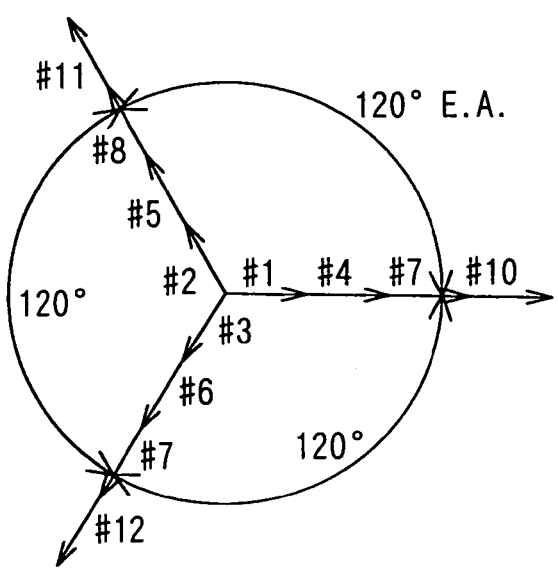
FIG. 4 is a vector diagram of output voltage of the ac generator.

Therefore, as clearly shown in FIGS. 4 and 9, the phase difference in the output voltage of the stator 200 according to the invention between the phase-windings is 120° although the order of the phases is opposite and no phase difference in the same phase winding. Therefore, no output power loss due to the phase difference is generated, and it is not necessary to increase the size of the permanent magnets.

Figure 5:
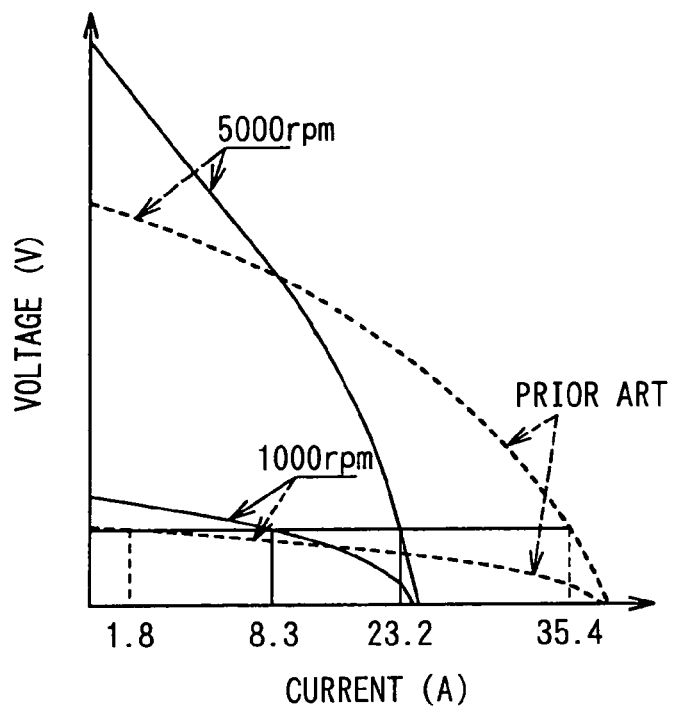
FIG. 5 is a graph showing a relationship between the output voltage and the output current of the ac generator.
Figure 6:
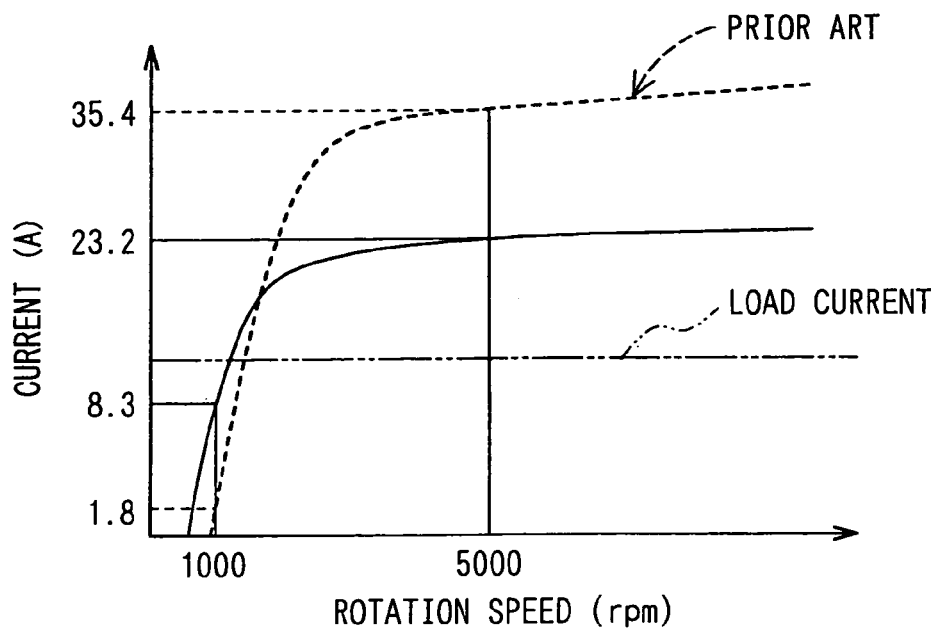
FIG. 6 is a graph showing a relationship between the output current and the rotation speed of the ac generator.

A result of an experiment shows that the permanent magnet type three-phase generator according to the invention in a range from a lower speed (1,000 rpm) to a higher speed (5,000 rpm) provides a smaller output current and a higher output voltage than a prior art permanent magnet type three-phase generator, as shown in FIGS. 5 and 6.

If the output current is measured with the voltage being kept constant, the output current of the permanent magnet type three-phase generator according to the invention at a lower speed (1,000 rpm) is larger than the prior art permanent magnet type three-phase generator, as shown in FIG. 6, so that battery charging current can be increased. On the other hand, the output current of the permanent magnet type three-phase generator according to the invention at a higher speed (5,000 rpm) is smaller than the prior art permanent magnet type three-phase generator, so that the coil temperature can be significantly reduced.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A permanent magnet type three-phase ac generator for a vehicle having an engine, said generator comprising:
    a stator having a stator core with 3n (n is an integer) teeth disposed in a circumferential direction at equal intervals and an armature winding having Δ-connected three phase windings with three output ends from which electric power is supplied to an electric load; and
    a rotor driven by said engine, said rotor having 4n permanent magnet poles disposed to confront said teeth,
    wherein said armature winding includes 3n coils each of which is wound around one of said teeth in the same winding direction and has first and second ends,
    the first end of each coil wound around one of said teeth is connected to the second end of another coil that is wound around a tooth disposed fourth from the one of said teeth to form one of said three phase-windings, and
    an electric angle between coils wound around adjoining teeth is 240°.

2. A three-phase alternating current generator for a vehicle having an engine, said generator comprising:
    a bowl-shaped flywheel driven by said engine;
    4n (n is a natural number) magnets provided on an inner circumferential surface of the flywheel; and
    a stator located in the flywheel, wherein the stator includes:
    3n teeth provided opposite to the magnets; and
    a plurality of coils continuously wound around every third tooth among the teeth to form a three-phase winding having three output ends for supplying the three-phase electric power that is generated by an electromagnetic induction effect with the magnets, wherein
    an electric angle between coils wound around adjoining teeth is 240°.

3. A three-phase alternating current generator according to claim 2, wherein the stator has a core made of a laminate of a steel plate.

4. A three-phase alternating current generator according to claim 2, wherein the number of magnets is 16 and the number of teeth is 12.

5. A permanent magnet type three-phase ac generator for a vehicle having an engine, said generator comprising:
    a cylindrical rotor driven by said engine, said rotor having alternately magnetized 4n (n is an integer) permanent magnet poles disposed in a circumferential direction at equal intervals to provide alternating magnetic field in the inside space of the rotor when it rotates; and
    a stator disposed in the inside space of said cylindrical rotor, said stator including a generally star-shaped stator core having 3n teeth at equal circumferential intervals to confront the permanent magnetic poles and Δ-connected three phase-windings mounted on the stator core to provide three output ends from which electric power is supplied to an electric load;
    wherein each of the three phase windings includes n coils each of which is wound around one of the teeth and connected to another coil wound around another tooth that is fourth from said one of the teeth, and
    an electric angle between coils wound around adjoining teeth is 240°.

* * * * *